(12) United States Patent
Jalkanen

(10) Patent No.: US 6,709,052 B2
(45) Date of Patent: Mar. 23, 2004

(54) SADDLE SEAT FOR CHAIR OR STOOL

(75) Inventor: Veli-Jussi Jalkanen, Rautalampi (FI)

(73) Assignee: Easydoing Oy, Rautalampi (FI)

(*) Notice: Subject to any disclaimer, the term of this patent is extended or adjusted under 35 U.S.C. 154(b) by 0 days.

(21) Appl. No.: 10/079,718

(22) Filed: Feb. 22, 2002

(65) Prior Publication Data

US 2002/0167206 A1 Nov. 14, 2002

Related U.S. Application Data

(63) Continuation of application No. 09/580,807, filed on May 30, 2000, now abandoned, which is a continuation-in-part of application No. PCT/FI99/00621, filed on Jul. 13, 1999.

(30) Foreign Application Priority Data

Jul. 13, 1998 (FI) .............................. 980340 U

(51) Int. Cl.[7] .................................. B62J 1/00
(52) U.S. Cl. ............. 297/202; 297/195.1; 297/215.16; 297/452.21; 297/452.25; 297/195.11; 297/461
(58) Field of Search ............... 297/195.1, 202, 297/452.21, 452.25, 215.16, 452.22, 195.11, 461

(56) References Cited

U.S. PATENT DOCUMENTS

| | | | |
|---|---|---|---|
| 731,778 A | * | 6/1903 | Holtzmuller et al. .. 297/452.25 |
| 800,458 A | * | 9/1905 | Martin ................... 297/452.25 |
| 1,004,589 A | | 10/1911 | Pridmore |
| 1,014,013 A | | 1/1912 | Martin |
| 3,025,105 A | | 3/1962 | Nash |
| 3,863,978 A | | 2/1975 | Gillings, Jr. |
| 3,890,004 A | | 6/1975 | Rail |
| 4,366,981 A | | 1/1983 | Ziegler et al. |
| 4,607,882 A | | 8/1986 | Opsvik |
| 4,746,044 A | | 5/1988 | Arvizu et al. |
| 5,374,109 A | | 12/1994 | Wortman |
| 5,988,739 A | | 11/1999 | Dodge et al. |
| 6,045,180 A | * | 4/2000 | Clutton ....................... 297/202 |

FOREIGN PATENT DOCUMENTS

| | | | |
|---|---|---|---|
| DE | 2618292 | 11/1977 | |
| DE | 43 00 602 A1 | 7/1994 | |
| EP | 0 163 437 A1 | * 12/1985 | ............ 297/452.21 |

* cited by examiner

Primary Examiner—Peter M. Cuomo
Assistant Examiner—Rodney B. White
(74) Attorney, Agent, or Firm—Pillsbury Winthrop LLP

(57) ABSTRACT

A saddle seat (1) which has a rounded center part (2), and side parts (3) which at least partially curve downwards at an angle from the center part in order to support the pelvis and thigh muscle of the seated person, the side parts (3) having front edges (4) which form an acute angle and between them is formed a space (5). The central edge section of the front edges (4) of the seat are curved backwards at an angle towards the center part of the seat (1) in order to form a space in between the edges which extends backwards.

8 Claims, 7 Drawing Sheets

SADDLE SEAT FOR CHAIR OR STOOL

CROSS-REFERENCE TO RELATED APPLICATIONS

This application is a continuation of application Ser. No. 09/580,807 filed May 30, 2000 (now abandoned) which was a continuation-in-part of International Application No. PCT/FI99/00621 filed Jul. 13, 1999 which claimed priority from, as does this application, Finnish application No. U980340 filed Jul. 13, 1998, the contents of all of which are hereby incorporated hereinto by reference.

The present invention relates to a saddle seat which has a rounded center part and side parts which at least partially curve downwards at an angle to the center part in order to support the pelvis and thigh muscles of the seated person, the side parts having front edges which form an acute angle to one another and between them is formed a space.

BACKGROUND OF THE INVENTION

When sitting on current seats and conventional saddle seats there is the problem that there is pressure put on the groin and pelvic area and the temperature in those areas increases. When sitting in upholstered chairs air circulation in the pants is bad and the temperature of the testes increases. The use of a belt and keeping the belt tight puts pressure on the stomach and pelvic muscles. Particularly the concentration of excess weight around the waist forces the belt to be drawn tight so that the pants stay in place. Air circulation inside the pants becomes worse and accelerates the accumulation of body heat in the groin area. However, the temperature in which sperm are normally produced is some degrees lower than the temperature of the body system.

If excess heat is continually present in this area, the situation can lead to diminished sperm production. Research has shown that the quality of sperm has an effect on fertility. Between the years 1940 and 1990, the quantity of sperm has decreased and the quality has become worse, particularly in western countries. When surveying reproductive health, a population study showed that there has been nearly a 50% decrease in men's sperm count the world over in the last 50 years. In the 1940's there were 114 million spermatozoa counted in a milliliter of sperm, while in the 1990's 66 million spermatozoa have been counted. This report was compiled from 61 studies and it covers nearly 1500 men in 20 different countries. The decrease in the quantity of spermatozoa can be explained by the chemical conversion in the environment. A second possibility is that a way of life given to prolonged periods of sitting has caused the temperature in the groin area to rise, thereby creating disadvantageous conditions for sperm production. Pants which are secured with a tightened belt do not allow the body heat to escape from the pants, so that the temperature of the testes (a.k.a. testicles) is able to rise to an above normal temperature. It has been found that disabled males using wheel chairs have a higher testes temperature than that of the healthy male test subjects. It is known that clothes which are too tight can reduce male fertility. Furthermore, it has been found that hot air decreases the quality of sperm.

According to literature, no research has ever been done on the influences that different types of chairs or seats, or the use of a belt that restricts the air circulation have on the temperature of the testes. With the support and locomotory system, at its worst, sitting can cause problems in extremities, the back and neck and shoulder region.

Nowadays, the working environment is such that a person must continuously be sitting and remain sedentary for prolonged periods of time. Nonetheless, the structure of our system has remained at the same stage it was in during the Stone Age. It is characteristic of a locomotory system to adapt to the effects of stress. The influencing forces can be internal or external forces (most importantly, gravity or the weight of external burdens) which have been built up by the muscles. The most commonly used chairs require that a person remain motionless. Immobility reduces the part that muscle activity contributes to the blood circulation. This affects the supply of nutrients and oxygen to the body tissue.

SUMMARY OF THE INVENTION

The present invention provides a seat which will eliminate the disadvantages associated with present-day chairs or seats. In particular, the invention provides a saddle seat which eliminates customary health and work productivity related problems which result from a regular seat or chair being used. Further, the invention provides a saddle seat which supports the seated person in a natural way which allows for increased air circulation in the inner thigh and pelvic area and which, when used, prevents the temperature of the testes from reaching as high a temperature as when common conventional seats are used.

The center front edge section of a saddle seat formed in accordance with the invention is curved at an angle extending backwards towards the center part of the seat in order to form a space in between the edges which also extends backwards. A space like this fits to the form of the thigh and extends upwards close to the pelvic bone of the seated person. The space produces an increase in air circulation in the inner thigh and pelvic area of the seated person, which cools the tissue in that particular area and cools down male testes and reduces their temperature.

The saddle seat has been structured and intended to bring about a natural and healthy way of sitting. The seat guides the seated person to sit with the thighs at an approximate 45° angle downwards and forward at an angle which helps to keep the pelvis in a straight relaxed position and creates an important hollow at the base of the spine for the benefit of the back. A person sitting on the seat can sit balanced upright and straight without back support. The side parts support the thighs in a kind of trough shaped for the thighs and the side parts are formed such that they are fitted to the contours of the thighs. The saddle seat supports the thighs along the length of the side parts in the direction of the thighs from the supporting point of the seat bone downwards.

In one advantageous application of the invention, the upper part of the space of the saddle seat is rounded. This structure is pleasant and supports the seated person.

The invention is now described in more detail with reference to the accompanying drawing in which:

BRIEF DESCRIPTION OF THE DRAWING VIEWS

DETAILED DESCRIPTION OF THE PREFERRED EMBODIMENTS

Figure 1:
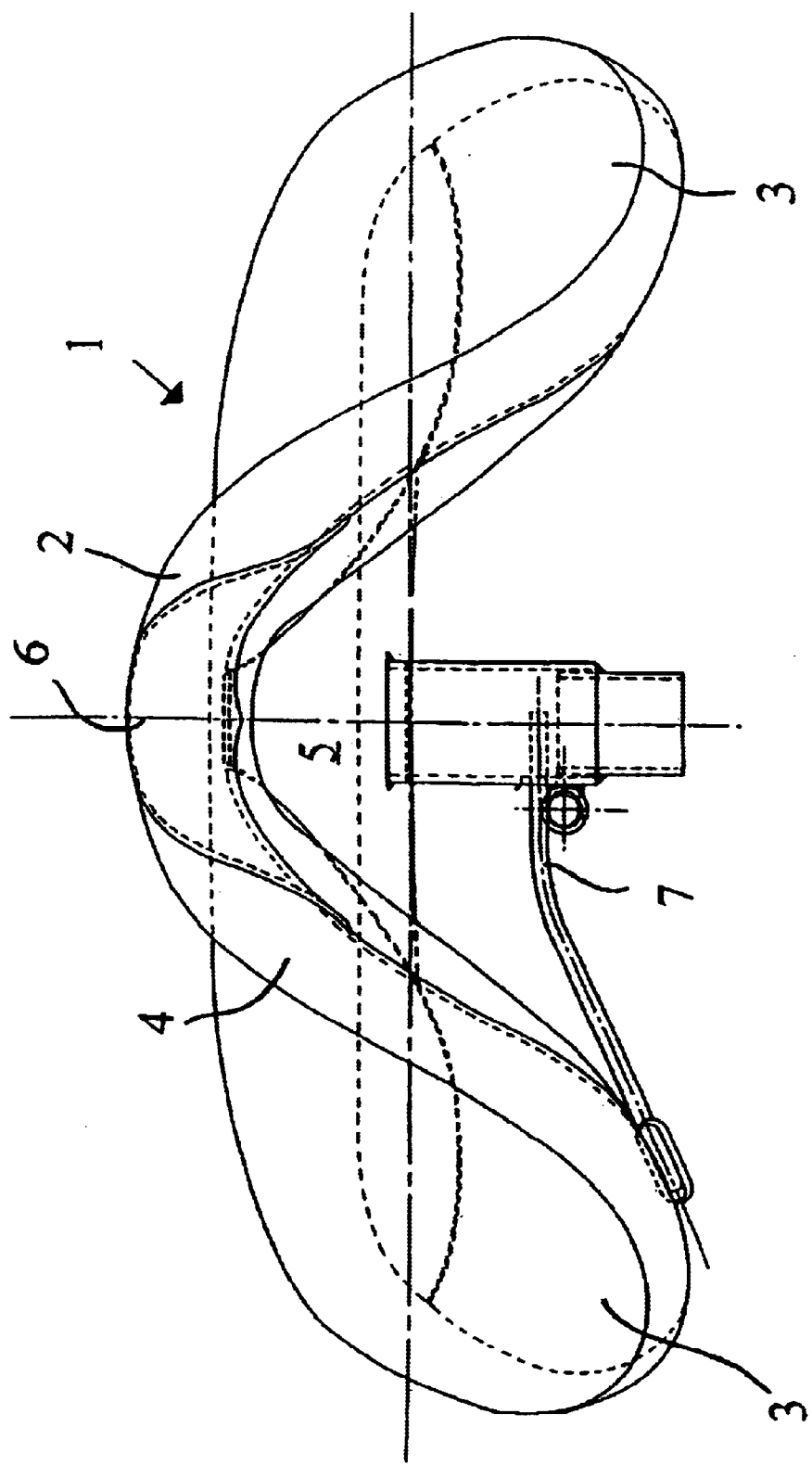
FIG. 1 illustrates a certain application of a seat formed in accordance with the invention, as viewed from the front.
Figure 2:
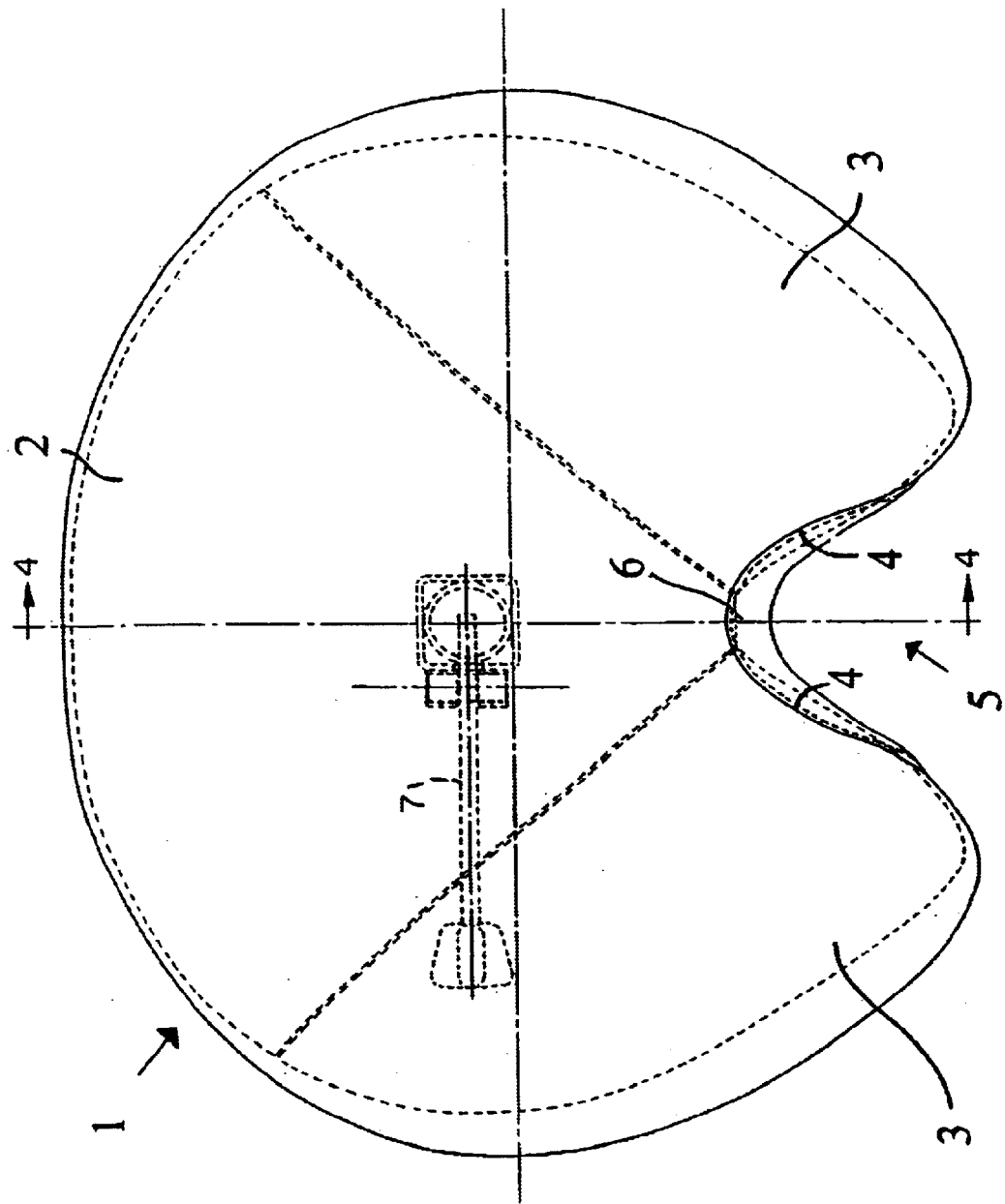
FIG. 2 illustrates a seat formed in accordance with FIG. 1 as viewed from above.
Figure 3:
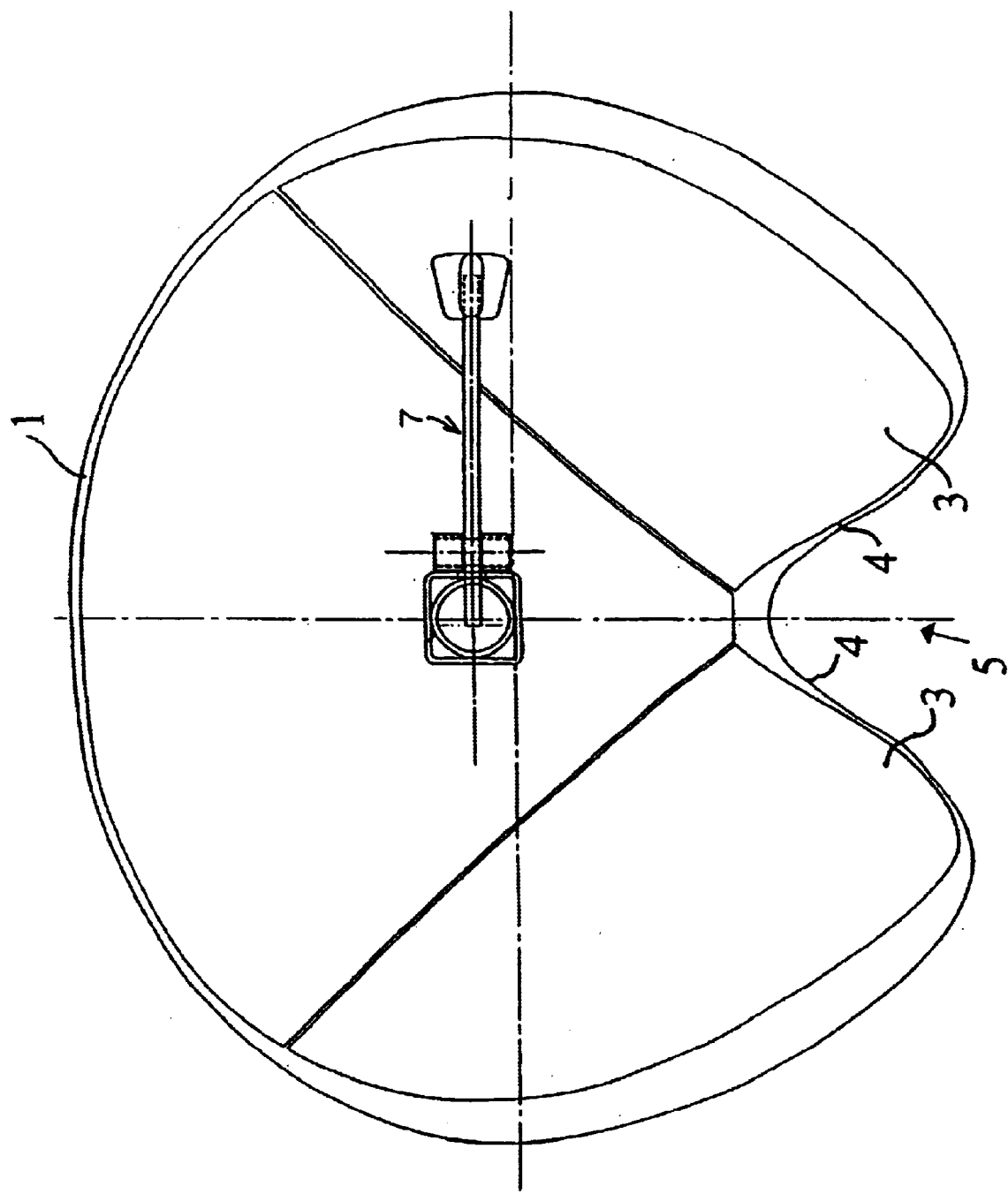
FIG. 3 illustrates a seat formed in accordance with FIG. 1 as viewed from underneath the seat.
Figure 4:
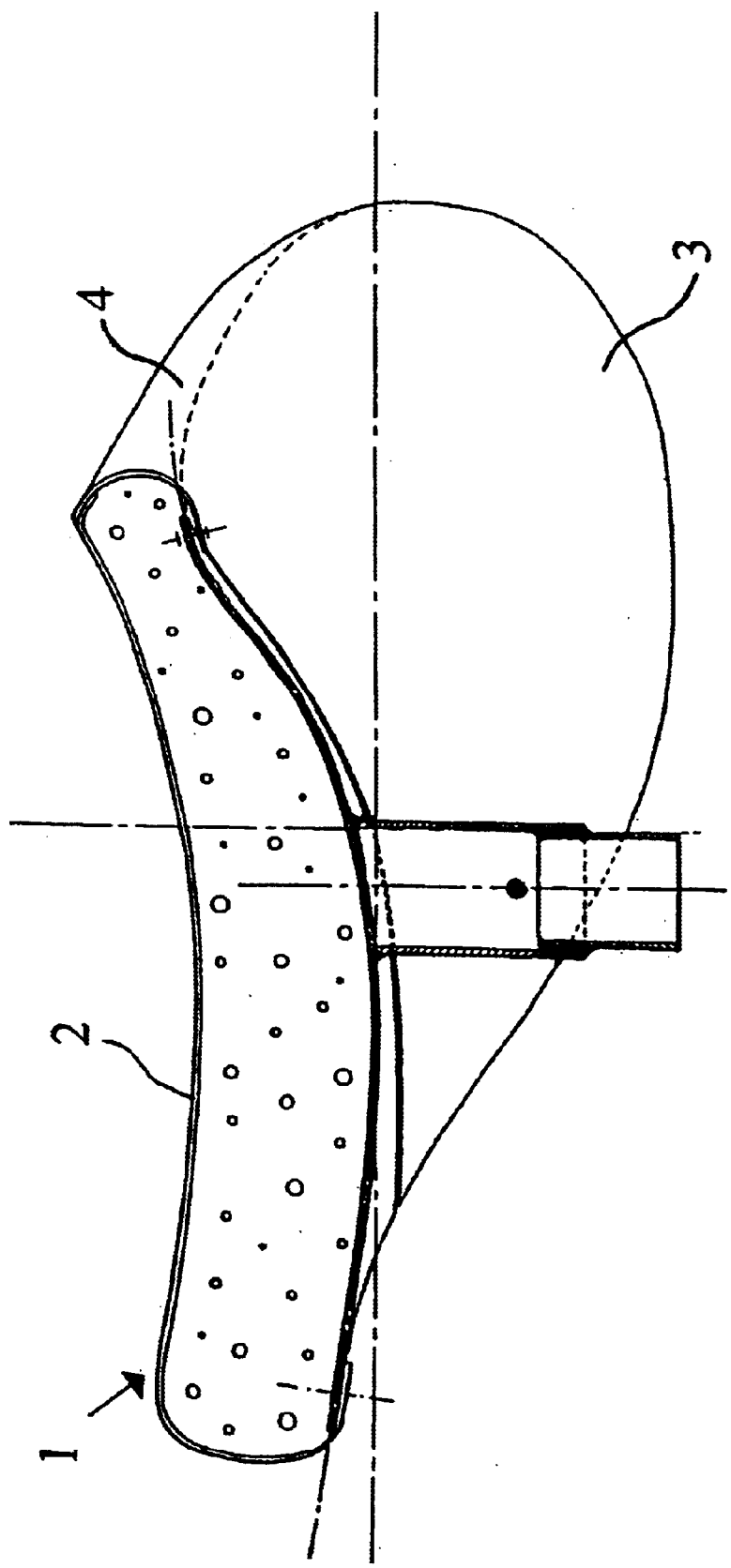
FIG. 4 illustrates a seat formed in accordance with FIGS. 1–3 as viewed from the side and a cross-section along the central line 4—4 of FIG. 2.

FIGS. 1–4 and 7 illustrate the saddle seat 1. The seat 1 has a rounded center part 2 (see FIG. 4) and side parts 3 which curve downwards at an angle from the center part. The side parts have front edges which are located in the front center of the seat part and extend at an angle to the vertical and to one another; they form an acute angle and come together at the top of the humped front of center part 2. The front edges 4 curve upwards at their lower parts and simultaneously at an angle backwards towards the center part of the seat. A space 5 is thus formed in between these edges, which extends essentially backwards in relation to the outer front edge of the seat. The space 5 is shaped such that it fits the leg space between the thighs. The upper part of the space 6 at the meeting point of the front edges is rounded. Likewise, all of the edges of the seat part are rounded.

Figure 7:
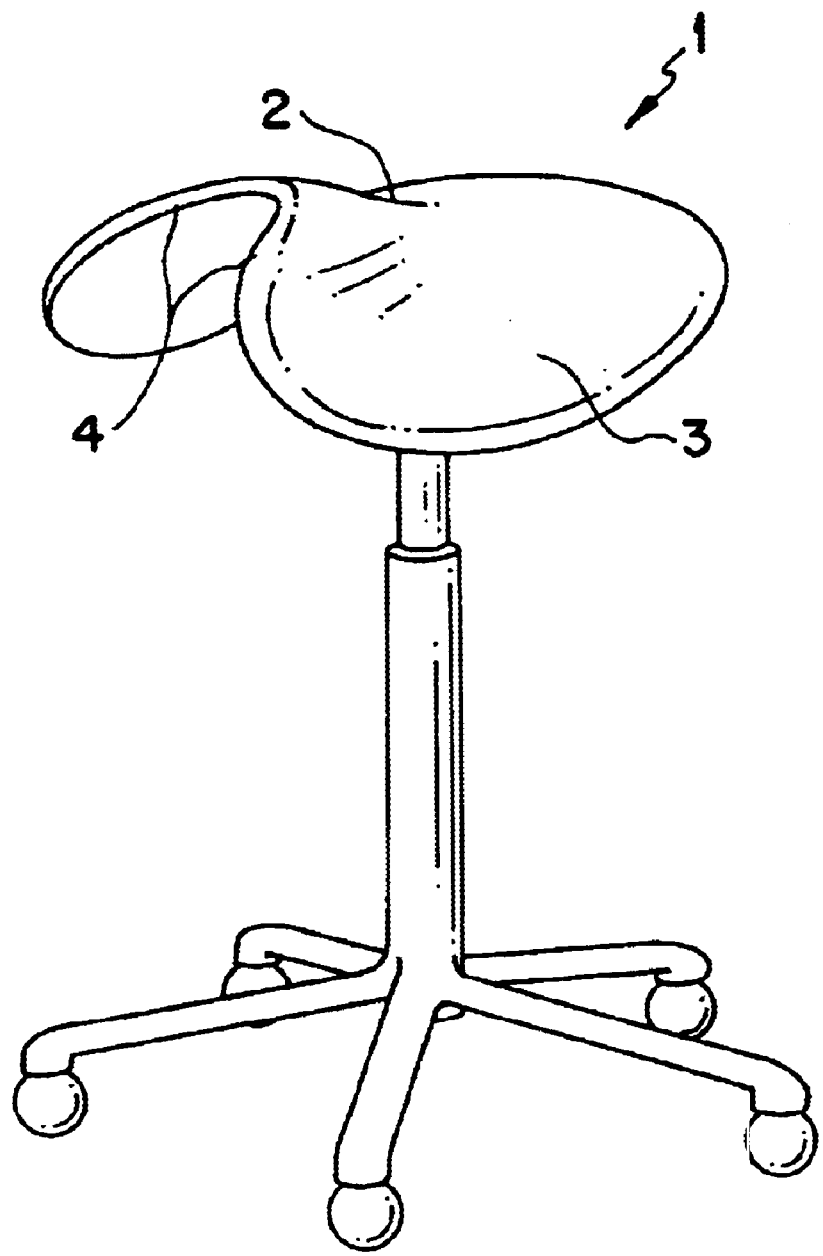
FIG. 7 illustrates an embodiment of a stool according to the present invention.

According to an embodiment illustrated in FIG. 7, the saddle seat 1 is fastened with a lower part of the stool. In the lower part there is a rod and under the seat there is a pipe for the rod.

Naturally, when used the seat is attached as such in a conventional way to the leg/foot, base or other corresponding part of a chair; however the leg/foot part or the attachment to it is not essential, nor is the leg/foot part presented here. A seat formed in accordance with the figures may be attached to the leg/foot part so that the elevation is adjustable, and FIG. 1 illustrates an adjusting device 7 by which the seat elevation can be adjusted in a conventional way.

The shape of the saddle seat follows the structure of the human pelvis in the form of a saddle, such that the outer edge of the chair follows the contour of the buttocks of a medium-sized person. Viewed from the side, the seat part is primarily saddle-shaped and when viewed from above it appears roundish with the exception of the space in the front part of the seat. In this application the saddle seat supports the thighs approximately 25–30 cm in the direction of the thighs descending from the supporting point of the seat bone. The side parts or thigh troughs are formed to sit against the inner surface of the thighs so that the front edges of the seat form aileron-like supports which partially raise the thighs to the front towards the inner surface of the thighs and thus prevent the person sitting on the seat from moving forward. At the same time the structure of the seat supports the seated person naturally and makes sitting pleasant. Furthermore air is able to circulate in the inner thigh and pelvic area better than with conventional seats.

The frame of the saddle seat, the cushioning and upholstery materials are materials which are suitable for the purpose; for example, the frame may be steel and the upholstery leather. The cushioning material in the seat may be a relatively thin padding material. In one example, there is only approximately 30 mm of padding beneath the seat bones, so that in this way the seat bones (the seat nodes being a part of the pelvic bones) are well supported by the frame. This prevents any concentration of pressure on the buttocks and thighs which retains the circulation of fluid to the lower extremities. The thickness of the padding material may vary in different applications.

Comparative Tests

A seat formed in accordance with the invention was tested and compared with other seats. The purpose of the study was:

1. To determine by means of objective measurements, whether there is a difference in the seats of a padded office chair, an unpadded one, wooden bench, saddle stool or chair (incorporating the saddle seat of the present invention and shown in FIG. 7), a knee support chair and sofa (with soft cloth upholstery) with respect to the skin temperature of the testes and the moisture in that area.
2. To determine the effect of shoulder straps (suspenders/braces) and belts on the skin temperature of the testes and on the moisture in that area.
3. To determine whether body mass index has an effect on these.

The study was done on eight (8) men who volunteered to participate. At the time of the study, the average age of the men was 42 (21–59) years. The anthropometric figures are shown in Table 1.

TABLE 1

The age of the men and the mean anthropometric measurements, minimum and maximum values.

| | N* | Min. | Max. | Mean value |
|---|---|---|---|---|
| Age = years | 8 | 21 | 59 | 42.75 |
| Height cm. | 8 | 169.0 | 184.0 | 174.90 |
| Weight kg | 8 | 58.0 | 97.0 | 72.81 |
| WHR = waist/hip ratio | 8 | .86 | 1.06 | .93 |
| BMI = weight(kg)/height(m)$^2$ | 8 | 18.90 | 28.60 | 23.69 |
| *N = number of men | 8 | | | |

Temperature Measurements

In the beginning of the study, the average temperature and moisture measurements of the test subjects' testes were taken during a 40 minute period in a cold room. In the beginning of the measuring period, the subjects stood for 5 minutes with their legs slightly astride. This was followed by a 30 minute measuring interval during which the subjects sat on the chair being tested. At the end of the measuring period the subjects stood for 5 minutes with their legs slightly astride. Temperature sensors were attached to both testes and the comparative body temperature was taken from the armpit. The surface moisture of the right testis was measured using one moisture sensor. The temperature of the room and humidity in the room were measured in connection with each measurement. Temperature and moisture measurements were taken with a portable battery-operated measuring device which did not interfere with the sedentary work (SQ 1021 Grant Instruments Ltd. Barrington, England). During the measuring period, the test subjects were wearing clothes made from the same material: underpants (briefs) (100% cotton, Boston, USA), trousers (Turo Tailor Oy Ab, Kuopio, Finland) and shirts (Petrifan classic, Petritex Oy, Kuopio, Finland) and socks.

In connection with the temperature study, measurements of the test subjects' BMI and WHR were taken and the subjects were asked about the symptoms of their locomotory system and their physical exercise practices. The tests were done in a heated chamber (23° C.) in which the air's relative humidity was 28%. The test subjects were reading during the measuring period.

Six different chairs were compared in the study:
1. Padded chair (Logic 2, Martela Oy, Helsinki, Finland)
2. Unpadded chair (plywood c. 481, Isku, Lahti, Finland)
3. Wooden bench (Pedihealth Oy, Oulu, Finland)
4. Saddle seat or a stool as in FIG. 7 (Salli saddle chair or stool, Easydoing Oy, Rautalampi, Finland). The position assumed on the seat is reminiscent of the sitting position on a horse. When sitting on the saddle seat, the test subject has approximately a 135 degree angle between the thighs and upright body, and the legs are nearly straight down.
5. Knee support chair (Stokke, Oslo, Norway)
6. Sofa chair (sop, cloth-upholstered, Isku, Lahti, Finland)

Results

Skin temperature of the testes in the six different seats

Figure 5:
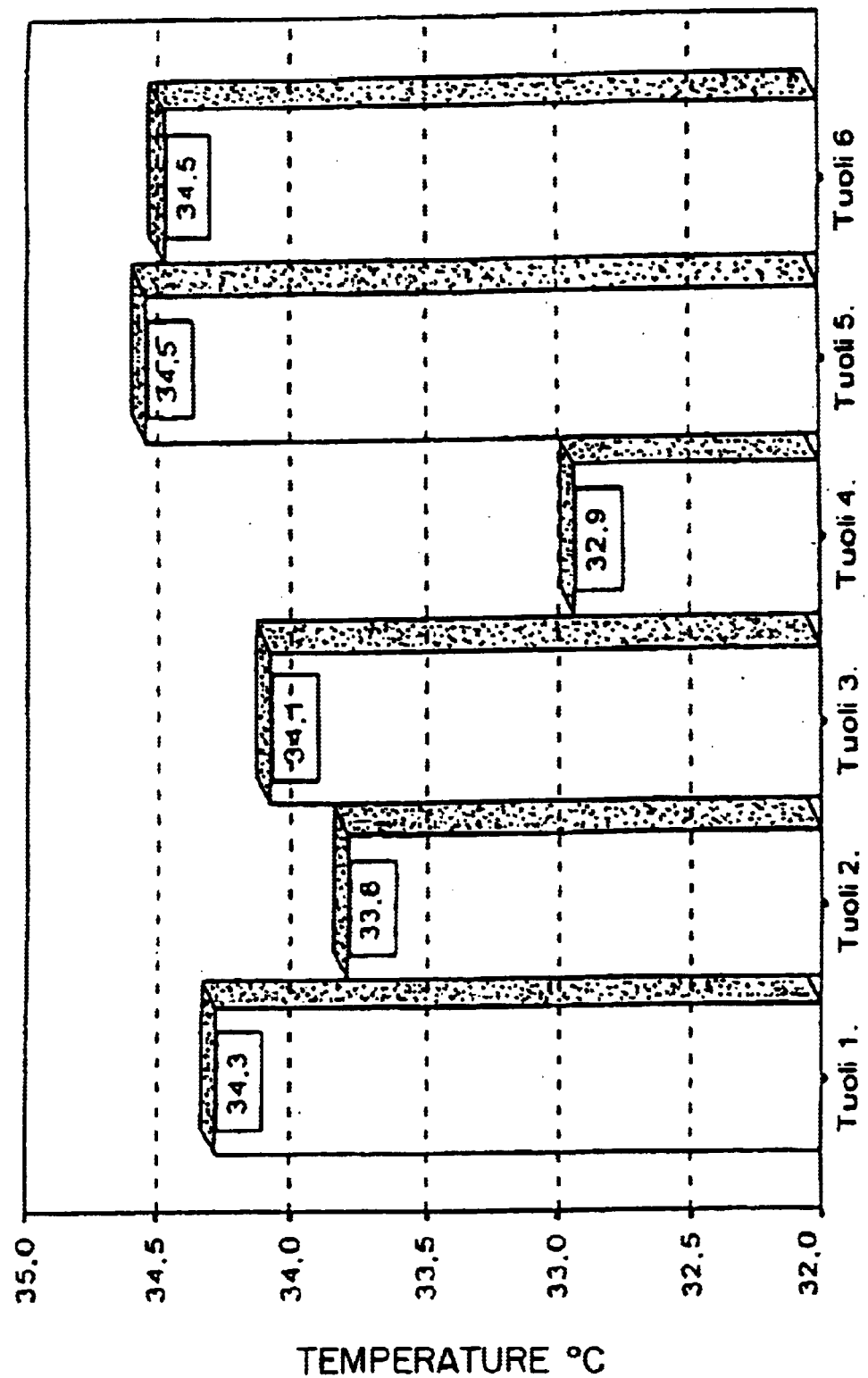
FIGS. 5 and 6 illustrate the results of a performed study.
Figure 6:
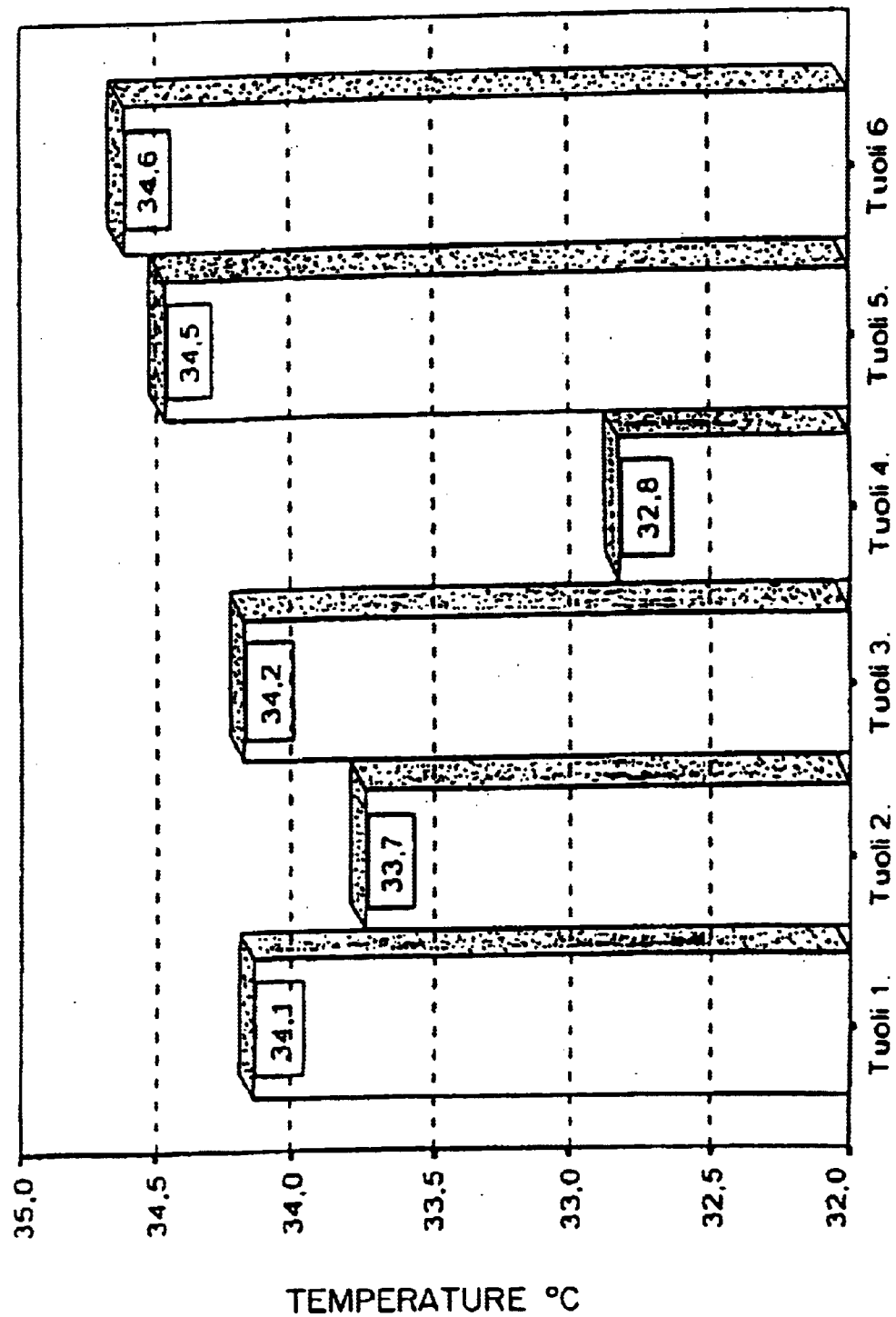

Table 2 and FIG. 5 illustrate the average skin temperatures of the testes after 30 minutes in each of the six chairs while a belt was being worn. The results show that the temperature was lowest in the saddle seat stool (No. 4). The difference in temperature is statistically significant compared to the other seats. Also when suspenders were used, the saddle seat yielded the lowest testes temperature. (Table 3 and FIG. 6). The difference is statistically significant compared to all the other seats. The difference in temperature for the seats of the unpadded chair, (No. 2), and chairs 5 and 6 is also statistically significant. There was no statistically significant difference between the two measures in testes temperatures taken in the same chair, once with a belt and once with suspenders.

TABLE 2

Skin temperature of the testes, minimum and maximum values in the six different chairs, subjects wearing belts.

| Chair | N | Min. | Max. | Mean |
|---|---|---|---|---|
| 1 | 8 | 32.85 | 36.67 | 34.27 |
| 2 | 8 | 32.52 | 35.36 | 33.79 |
| 3 | 8 | 32.48 | 35.58 | 34.07 |
| 4 | 8 | 31.10 | 34.65 | 32.93 |
| 5 | 8 | 32.94 | 36.06 | 34.54 |
| 6 | 8 | 32.69 | 36.09 | 34.47 |

TABLE 3

Skin temperature of the testes, minimum and maximum values in the six different chairs, subjects wearing suspenders.

| Chair | N | Min. | Max. | Mean |
|---|---|---|---|---|
| 1 | 8 | 32.70 | 36.38 | 34.13 |
| 2 | 8 | 32.54 | 35.87 | 33.74 |
| 3 | 8 | 32.53 | 35.90 | 34.17 |
| 4 | 8 | 31.03 | 34.63 | 32.81 |
| 5 | 8 | 33.30 | 35.89 | 34.46 |
| 6 | 8 | 33.16 | 36.43 | 34.61 |

Moisture

Tables 4 and 5 show the average, minimum and maximum skin moisture values of the right testis. The average moisture measurement of the groin, while subjects were wearing suspenders, was lowest in the saddle seat stool. Compared to the other chairs, the average moisture measurement in the groin area was also lowest in the saddle seat stool while the subjects were wearing belts. In the saddle seat stool, the moisture percentage with suspenders was 51 percent, and with a belt 55 percent. The highest moisture percentage in the groin area was measured in chair 5. The average moisture value in the groin area did not have a statistically significant difference with a level of significance of 0.05 with regard to the chairs and use of the belt or suspenders.

TABLE 4

The average, minimum and maximum skin surface moisture values of the right testis, taken in six different chairs, subjects wearing belts.

| Chair | N | Min. | Max. | Mean |
|---|---|---|---|---|
| 1 | 8 | 17.30 | 96.05 | 61.49 |
| 2 | 8 | 26.00 | 82.20 | 60.37 |
| 3 | 8 | 29.55 | 86.55 | 65.62 |
| 4 | 8 | 19.80 | 81.50 | 55.33 |
| 5 | 8 | 24.85 | 88.55 | 67.81 |
| 6 | 8 | 23.95 | 89.70 | 66.68 |

TABLE 5

The average, minimum and maximum skin surface moisture values of the right testis, taken in six different chairs, subjects wearing suspenders.

| Chair | N | Min. | Max. | Mean |
|---|---|---|---|---|
| 1 | 8 | 23.65 | 86.35 | 60.20 |
| 2 | 8 | 29.35 | 88.65 | 63.82 |
| 3 | 8 | 23.10 | 91.90 | 65.26 |
| 4 | 8 | 19.95 | 78.55 | 50.75 |
| 5 | 8 | 21.75 | 92.15 | 67.20 |
| 6 | 8 | 20.90 | 93.40 | 58.65 |
| N | 8 | | | |

Examination of the Results

The study indicates that when men sit in the saddle seat, their testes skin temperature is lower than when they sit in the other chairs tested. The moisture in the testes area was also lower in the saddle seat. These study results support Brindley's (1982) research observations that when men sit with their legs nearly together on a soft chair, the temperature of the testes rises and thus sperm production decreases. The effect of the waist-hip ratio and body mass index on the temperature of the testes indicates that overweight men have a higher testes temperature than men who are at the right weight, but there is not enough data to make this comparison. These results may arise from the fact that the air circulation in the pants was bad, or the excess body mass or fat restricts the testes so that air and blood circulation become weaker (or the testes are pressed too close to the stomach and thighs). With padded chairs, the testes temperature is higher than with unpadded chairs. There was no difference in the temperature of the testes when suspenders were used, as opposed to a belt. Suspenders had a slight effect on the moisture in the groin area. With the saddle seat chair there was no difference between measures taken with suspenders and measures taken with a belt.

Conclusion

1. There are distinct differences in the temperature of men's testes area when they sit on different chairs. Testes temperatures taken in my saddle seat stool or chair (number 4) were the lowest. The highest temperatures were measured in the knee support chair and sofa, that is to say chair numbers five and six. The saddle seat also yielded the lowest measurements in moisture. This being the case, a seat formed in accordance with this invention can affect a significant change in the temperature in the pelvic area of the seated person, and in men in the temperature of the testes.

2. Use of suspenders or a belt did not have any significant influence on the skin temperature or moisture of the testes. With suspenders, lower temperatures were attained to some extent in chairs 1, 2, 4 and 5. The relative moisture in the groin area was lower with suspenders in all of the chairs except for chair number 2.

The invention is not limited to the advantageous application set forth herein. The invention is versatile and its form may vary within the framework of the invention recited in the following claims.

I claim:

1. A saddle seat comprising:

a rounded center part having a forward portion and a rearward portion, the center part sloping generally upwardly from the rearward portion towards the forward portion; and side parts extending along an entire length of the center part and having a rearward portion and a forward portion, the side parts sloping generally downwards at an angle from the center part from the rearward portion thereof towards the forward portion thereof, the side parts structured to support a pelvis and thigh muscles of a seated person such that the seat guides the seated person to sit with thighs thereof at an angle downwards and forwards with respect to the center part in use.

2. A saddle seat in accordance with claim 1, wherein the side parts having front edges that form an acute angle with respect to one another, the front edges curving upwards from lower parts thereof and simultaneously at an angle backwards towards a center part of the seat, and wherein the front edges form an open space therebetween, the space extending backwards from the front edges towards the center part of the seat.

3. A saddle seat in accordance with claim 2, wherein the space facilitates air circulation in inner thigh and pelvic areas of the seated person.

4. A saddle seat in accordance with claim 2, wherein an upper part of the space at a meeting point of the front edges is rounded.

5. A saddle seat in accordance with claim 1, further comprising:

a base that supports the seat at a height from the ground; and an adjusting device connected between the base and seat that adjusts the height.

6. A saddle seat in accordance with claim 1, wherein all edges of the seat are rounded.

7. A saddle seat in accordance with claim 1, wherein the front edges of the seat form aileron-like supports.

8. A saddle seat comprising:

a rounded center part having a forward portion and a rearward portion, the center part sloping generally upwardly from the rearward portion towards the forward portion; and side parts extending along an entire length of the center part and having a rearward portion and a forward portion, the side parts sloping generally downwards at an angle from the center part from the rearward portion thereof towards the forward portion thereof, the side parts structured to support a pelvis and thigh muscles of a seated person such that the seat guides the seated person to sit with thighs thereof at an angle downwards and forwards with respect to the center part in use, the side parts having front edges that form an acute angle with respect to one another, the front edges sloping upwards from lower parts thereof and simultaneously at an angle backwards towards a center part of the seat, wherein the front edges form an open space therebetween, the space extending backwards from the front edges towards the center part of the seat.

* * * * *